United States Patent
Ardeli

(10) Patent No.: US 11,816,216 B2
(45) Date of Patent: Nov. 14, 2023

(54) PREVENTING MALWARE DOWNLOADS

(71) Applicant: HEWLETT PACKARD ENTERPRISE DEVELOPMENT LP, Sping, TX (US)

(72) Inventor: Ramesh Ardeli, Sunnyvale, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 394 days.

(21) Appl. No.: 16/061,856

(22) PCT Filed: Jan. 27, 2016

(86) PCT No.: PCT/US2016/015110
§ 371 (c)(1),
(2) Date: Jun. 13, 2018

(87) PCT Pub. No.: WO2017/131662
PCT Pub. Date: Aug. 3, 2017

(65) Prior Publication Data
US 2018/0373875 A1    Dec. 27, 2018

(51) Int. Cl.
*G06F 21/56* (2013.01)
*G06F 21/50* (2013.01)
(Continued)

(52) U.S. Cl.
CPC .......... *G06F 21/566* (2013.01); *G06F 21/50* (2013.01); *G06F 21/56* (2013.01); *H04L 12/22* (2013.01);
(Continued)

(58) Field of Classification Search
CPC ........ G06F 21/566; G06F 21/56; G06F 21/50; H04L 12/22; H04L 12/743; H04L 63/145;
(Continued)

(56) References Cited

U.S. PATENT DOCUMENTS

| 6,199,107 | B1 * | 3/2001 | Dujari ................. G06F 16/9574 |
| | | | 709/219 |
| 7,640,586 | B1 * | 12/2009 | Johnson ................ G06F 21/563 |
| | | | 713/188 |

(Continued)

FOREIGN PATENT DOCUMENTS

| CN | 103152371 A | 6/2013 |
| CN | 104166586 A | 11/2014 |

(Continued)

OTHER PUBLICATIONS

Anonymous: "Resolve Adobe Updater Issues on the WSA—Cisco", available online at <https://www.cisco.com/c/en/us/support/ docs/security/web-security-appliance/118158-troubleshoot-wsa-00.html>, Aug. 5, 2014, 2 pages.

(Continued)

*Primary Examiner* — Khalid M Almaghayreh
(74) *Attorney, Agent, or Firm* — Hewlett Packard Enterprise Patent Department

(57) ABSTRACT

An example embodiment of the present techniques determines, in response to a byte-serving request to download a portion of a resource, that the resource has previously been determined to comprise malware. Further, the byte-serving request is modified to request downloading all the resource. Additionally, all the resource is requested for downloading using the modified byte-serving request.

20 Claims, 7 Drawing Sheets

(51) Int. Cl.
*H04L 12/22* (2006.01)
*H04L 9/40* (2022.01)
*H04L 45/7453* (2022.01)

(52) U.S. Cl.
CPC ........ *H04L 45/7453* (2013.01); *H04L 63/126* (2013.01); *H04L 63/145* (2013.01); *H04L 63/1416* (2013.01); *H04L 63/02* (2013.01)

(58) Field of Classification Search
CPC .............. H04L 45/7453; H04L 63/126; H04L 63/1416; H04L 63/02; H04L 29/06
USPC ................. 726/23–25, 27, 30; 709/223–226; 711/216
See application file for complete search history.

(56) References Cited

U.S. PATENT DOCUMENTS

| | | | |
|---|---|---|---|
| 8,087,085 B2 | 12/2011 | Hu et al. | |
| 8,850,584 B2 | 9/2014 | Alme et al. | |
| 8,869,279 B2 | 10/2014 | Shulman et al. | |
| 9,135,439 B2 | 9/2015 | Montoro | |
| 10,057,279 B1* | 8/2018 | Balduzzi ............... | H04L 63/145 |
| 2003/0097591 A1* | 5/2003 | Pham ..................... | G06F 21/564 |
| | | | 726/24 |
| 2003/0200175 A1* | 10/2003 | Wang ..................... | G06Q 20/10 |
| | | | 705/50 |
| 2005/0021994 A1* | 1/2005 | Barton ................... | G06F 21/562 |
| | | | 726/26 |
| 2007/0192857 A1 | 8/2007 | Ben-Itzhak | |
| 2007/0288484 A1* | 12/2007 | Yan ...................... | H04L 67/1019 |
| 2009/0094377 A1* | 4/2009 | Zahavi .................... | H04L 67/34 |
| | | | 709/232 |
| 2009/0300761 A1* | 12/2009 | Park ....................... | G06F 21/562 |
| | | | 707/999.102 |
| 2011/0126287 A1* | 5/2011 | Yoo ..................... | H04L 63/1441 |
| | | | 726/24 |
| 2011/0219450 A1 | 9/2011 | McDougal et al. | |
| 2012/0185939 A1 | 7/2012 | Turbin | |
| 2013/0145470 A1 | 6/2013 | Richard et al. | |
| 2013/0276126 A1* | 10/2013 | Zhou ................... | H04L 63/1433 |
| | | | 726/25 |
| 2014/0310386 A1 | 10/2014 | Srinivasan et al. | |
| 2015/0288706 A1* | 10/2015 | Marshall ............... | H04L 63/123 |
| | | | 726/23 |
| 2017/0171291 A1* | 6/2017 | Allen .................... | H04L 67/563 |
| 2018/0225230 A1* | 8/2018 | Litichever ............... | G06F 21/82 |
| 2018/0359297 A1* | 12/2018 | Mihály ................... | H04L 65/80 |

FOREIGN PATENT DOCUMENTS

| | | |
|---|---|---|
| CN | 104200164 A | 12/2014 |
| CN | 104217165 A | 12/2014 |
| EP | 2490370 A2 | 8/2012 |

OTHER PUBLICATIONS

Anonymous: "WSA Cisco Web Reputation Overview", Jun. 26, 2014, 2 pages.
Cisco: "Cisco Web Security: Protection, Control, and Value", Mar. 6, 2015, 6 pages.
Cisco: "Configuration Change for Content Filters acting on WBRS Neutral Reputation—Cisco", available online at <URL:https://www.cisco.com/c/en/us/support/docs/security/email-security-appliance/200050-Configuration-Change-for-Content-Filters.html>, Sep. 5, 2016, 2 pages.
Erik Kaiser: "Ironport WSA "rangerequestdownload" option—Cisco Community", available online at <URL:https://community.cisco.com/t5/web-security/ironport-wsa-quot-rangerequestdownload-quot-option/td-p/2073583>, Sep. 26, 2012, 2 pages.
European Search Report and Search Opinion Received for EP Application No. 16888396, dated Jul. 15, 2019, 10 pages.
Alapan Arnab et al., "Practical Experiences with Purenet, a Self-learning Malware Prevention System," Mar. 5-6, 2010, pp. 1-15, Springer Link.
PCT International Search Report cited in Appl. No. PCT/US2016/015110; dated Sep. 12, 2016; 3 pages.
Zhang et al., Abstract on "A defense framework against malware and vulnerability exploits", International Journal of Information Security, Oct. 31, 2014, 1 page.

\* cited by examiner

100

400

PREVENTING MALWARE DOWNLOADS

BACKGROUND

Malware refers to a variety of dangerous or otherwise undesirable software that includes viruses, ransomware, spyware, and other, malicious applications. Malware can take the form of executables, scripts, or other infected software that may be downloaded to, and installed on, a computer. In many cases, firewalls are used to detect malware and prevent its installation before it can be do any harm. Specifically, the firewall stops the download of the malware infected file before it is complete. However, in some scenarios, it is possible for a user to request that the download be completed. If the user makes such a request, the firewall may not detect the malware on the subsequent download, thereby infecting the requesting device.

BRIEF DESCRIPTION OF THE DRAWINGS

Certain example embodiments are described in the following detailed description and in reference to the drawings, in which.

DETAILED DESCRIPTION

Figure 1:
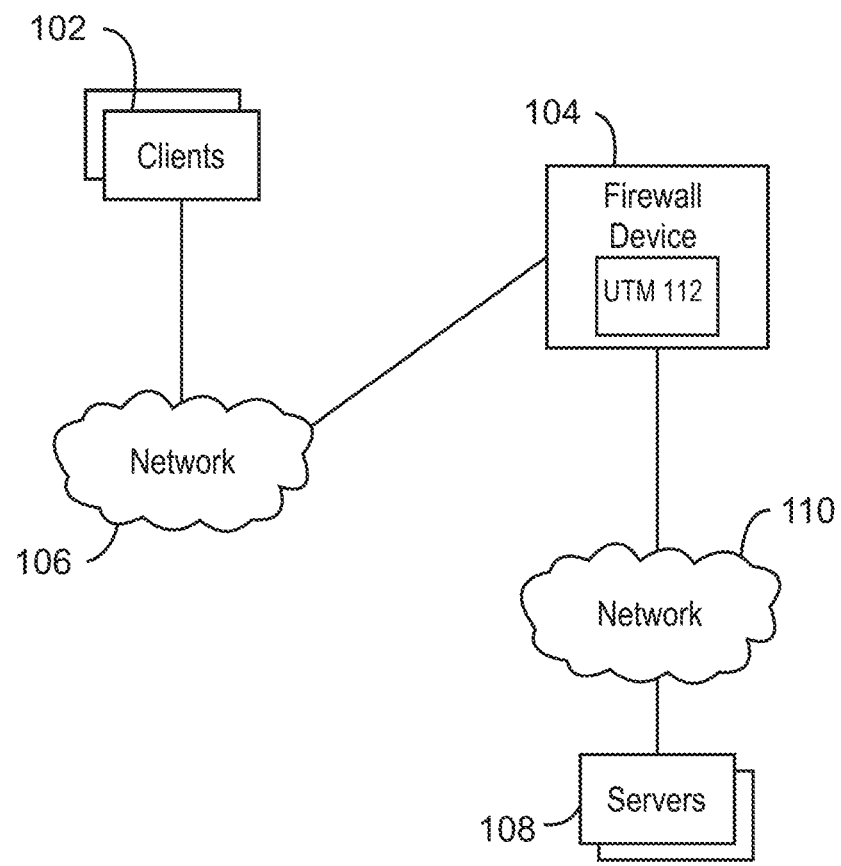
FIG. 1 is a block diagram of an example system for preventing malware downloads.

Typically, malware may be detected using stream-based scanning, file-based scanning, or advanced heuristics. Stream-based scanning is the process of scanning each packet of a requested resource as it is downloaded. Resources may be files or other content, such as downloadable files and web pages. File-based scanning is the process of scanning an entire file once it is downloaded. Advanced heuristics refers to the process of determining the susceptibility of a system towards a particular threat using various decision rules. With this method, many previously undetected viruses can be detected. Once malware is detected, the downloaded packets are dropped. Further, subsequent packets sent though the same network connection are dropped or quarantined.

For stream-based and file-based scanning, malware may be detected using signature matching, computing a hash value over the complete file, or both. This may be done in hardware or software. In signature matching, a list of signatures of known malware is predefined, and the received packets, or file, are scanned for a match to any of the signatures in the predefined list. In hash computation, such as MD5 hash computation, a list of MD5 hash entries is maintained for resources known to be infected with malware. An MD5 hash value is then computed for the received packets, or file, and a hash lookup is performed against the maintained list to determine if the received packets, or file, are infected with malware.

In stream-based scanning, signature matching and an incremental MD5 hash computation is done inline. In file-based scanning, the signature matching and MD5 hash computation are done on the complete file. Until the downloaded resource is found to be clean, the complete file containing the resource is not set to the device requesting the download. Further, when these methods detect malware, the received packets are dropped, and the requesting device is usually not made aware of the presence of malware in the requested resource. The network connection is subsequently terminated. As a result, it is possible for the requesting device to re-request the same resource from the last byte it received using the hypertext transfer protocol (HTTP) byte serving feature. The HTTP byte serving features enables a device to complete a download, starting at the last packet received in a previous attempted download. The complete resource is then re-assembled using the packets downloaded on the first attempted download, and the packets downloaded on the subsequent request. Since the remaining packets are downloaded on the subsequent request, and on a new connection, neither stream-based nor proxy-based scanning methods are able to detect the malware. Thus, an infected resource may be allowed to pass through to the requesting device.

However, in embodiments of the claimed subject matter, a hash lookup table is maintained for all resources determined to be infected with malware. Then, all HTTP byte-serving requests are intercepted to determine if they are attempting to access a resource that has previously been determined to contain malware. If so, the HTTP byte serving request is modified so that the entire file containing the resource is downloaded, instead of just the remaining packets. In this way, malware may again be detected as the full resource is downloaded.

FIG. 1 is a block diagram of an example system 100 for preventing malware downloads. The example system is generally referred to by the reference number 100 and can be implemented using the example computing device 402 of FIG. 4 below.

The example system 100 of FIG. 1 includes clients 102 and a firewall device 104 in communication over a network 106. The system 100 also includes servers 108 in communication with the firewall device 104 over network 110. The clients 102 may be computing devices, such as desktop computers, laptop computers, tablet computers, smartphones, and the like. The firewall device 104 is a security system that monitors and controls the network traffic incoming to, and outgoing from, the network 106. The firewall device 104 includes a unified threat manager (UTM) 112. The UTM 112 is security software that may be capable of performing network firewalling, network intrusion prevention, anti-virus and anti-spam functions, and the like. The network 106 may be a computer communication network, such as a local area network. The servers 108 may be web servers, or ftp servers, that host resources requested by the clients 102. The network 110 may be a computer communication network or collection of networks, such as the Internet.

The clients 102 make requests through the firewall device 104 for resources from the servers 108. The firewall device 104 receives the requests from the clients 102, and passes the requests to the servers 108. The servers 108 respond to the requests by downloading the requested resources back to the firewall device 104. The UTM 112 then performs either stream-scanning or proxy-scanning to detect malware.

In stream-scanning, the scanning is performed inline, where every packet is subjected to a signature match of known malware, and an incremental hash computation. Once the end-of-file is detected, the computed hash value is used for a hash lookup against a hash table containing list of known malware. If either a signature match is detected in the middle of the file, or the hash lookup succeeds, the resource is infected with malware. If the malware is detected due to a signature match, the rest of the packets from the server are dropped, thereby preventing the malware from entering the client 102. If malware is detected as a result of the hash lookup, the last packet of the file is dropped. As a result, the client 102 does not receive the complete file, thereby preventing the malware from infecting the client 102.

In proxy, or file-based scanning, the complete file is copied to local memory on the firewall device 102, re-assembled, and scanned for malware. Until the file is found to be clean, no packet is sent to the client. Once the file is found to be clean, the firewall device 102 sends the complete file content to the client 102. However, if malware is detected, the file is dropped, and a reset message (TCP RST) is sent to the client 102.

Additionally, if malware is detected, an entry for the infected resource is stored locally. Subsequently, when a client 102 requests a resource to be downloaded using the HTTP byte-serving feature, the UTM 112 performs a lookup in the local store to determine if the requested resource has been previously determined to be infected with malware. If the lookup is successful, the request is modified such that the entire resource will be downloaded, instead of just the remaining packets. The modified request is then passed to the server 108, the full resource is downloaded, and either stream-scanning or proxy-scanning are used to detect malware.

Figure 2:
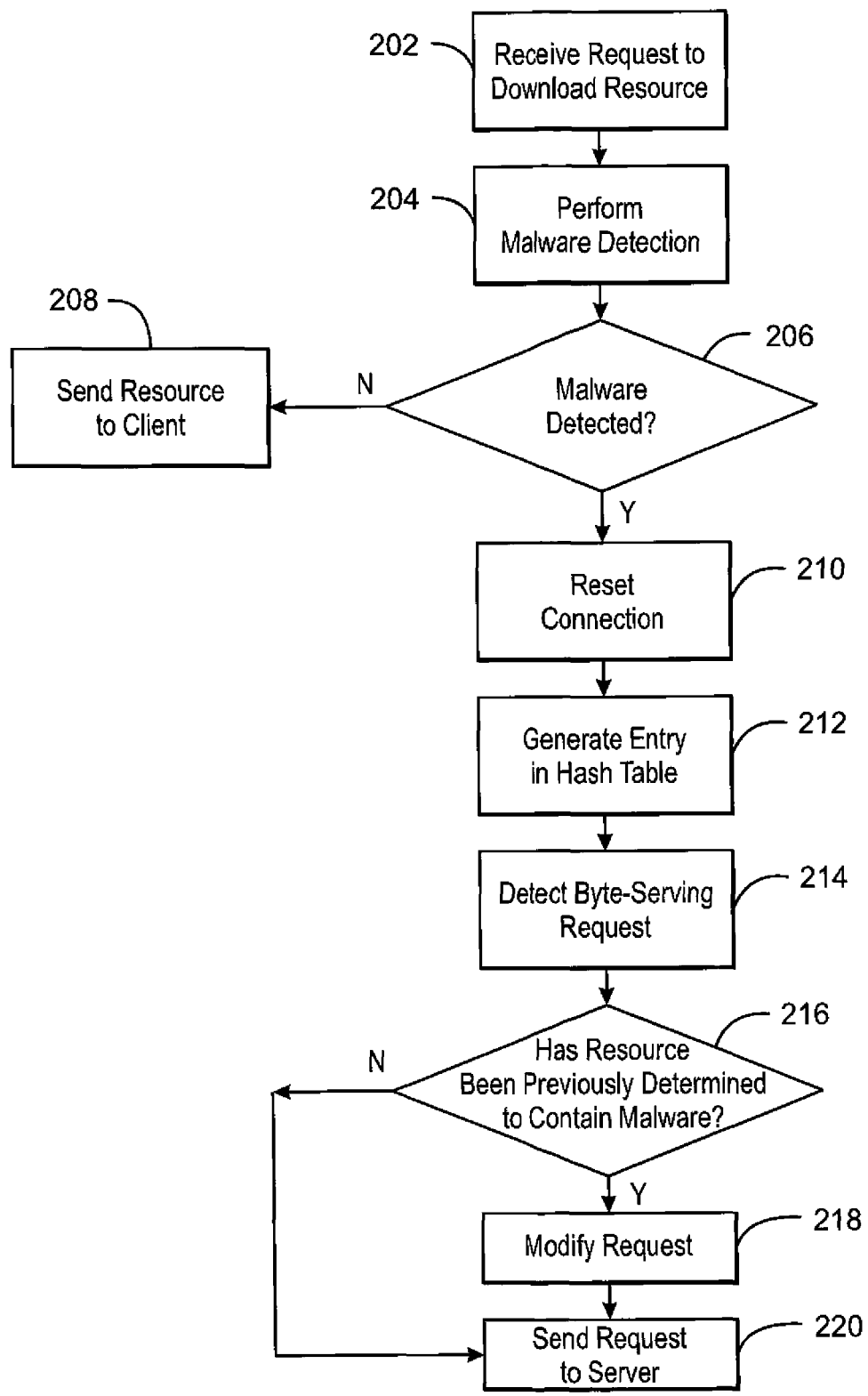
FIG. 2 is a process flow diagram showing an example method of preventing malware downloads.

FIG. 2 is a process flow diagram showing an example method 200 of preventing malware downloads. The example method is generally referred to by the reference number 200 and can be implemented using the processor 408 of the example system 400 of FIG. 4 below.

The method 200 begins at block 202, where the firewall device 104 receives a request from a client 102 to download a resource. The firewall device 104 passes the request to the server 108 specified in the request, and downloads the resource to the firewall device 104. The request may include HTTP headers, such as shown in Packets 1 and 2:

GET/samples/Sample5.PDF HTTP/1.1\r\n
Host:www.hostname.com\r\n
PACKET 1
HTTP/1.1 200 OK
Date: Day Month Year Hour:Minute:Second GMT
Server: ServerName
ETag: "ca33-47ac67b902480"
Accept-Range: bytes
Content-Length: 51763
Content-Type: application/pdf
PACKET 2

The ETag is an opaque identifier assigned by the server 108 to each resource of the pages served. If resource files changes, the server 108 assigns a new ETag for that resource. This ETag is part of HTTP protocol, which is used for cache validation and instructing the browser to make conditional requests. The Accept-Range defines the unit of measurement for download: words, bytes, or bits. The Content-Length defines the size of the resource in the units of the Accept-Range. The Content-Type defines what type of file the resource is.

At block 204, malware detection is performed on the resource as it is downloaded, using signature matching and hash lookup. In signature matching, the received packets are scanned for malware by matching against a list of known malware signatures. This may be performed using software or hardware, such as hardware regular expression (regex) engines. Since malware can be spread across more than one packet, hardware regex engines support multi-packet signature detection, using buffers to store data from previous packets. If there is a signature match, the resource is infected with malware. In hash lookup, when the UTM 112 detects the end-of-file, the hash computation completes and a lookup is done in a table of hash entries for known malware. If the lookup succeeds, the resource may be infected with malware.

At block 206, the UTM 112 determines whether malware has been detected. If not, control flows to block 208, where the resource is sent to the client 102. If malware has been detected, control flows to block 210, where the connection is reset and the packets are dropped. For malware detection through signature matching, the UTM 112 drops the last received packet and any subsequent packets. For malware detection through hash lookup, the UTM 112 drops the last received packet. In this way, the malware is prevented from infecting the client. However, if the client 102 were to initiate a new request for the same resource again, an HTTP GET request may be generated for retrieving partial content, i.e., a byte-serving request. Without implementation of the claimed subject matter, the remaining packets may be downloaded, thereby infecting the client 102.

Accordingly, at block 212, the UTM 112 generates an entry in a hash lookup table for the infected resource. This hash lookup table contains entries for resources where malware has been detected, and is separate from the hash lookup table for malware detection. Instead of hash values for the entire file of a resource, this detected malware hash lookup table contains hash values for the absolute uniform resource locator of the infected resource.

As stated previously, when malware is detected, the client 102 may be left unaware that the download was stopped, and the connection reset, due to malware detection. Accordingly, the client 102 may generate a byte-serving request to retrieve the remaining packets of the resource. If the original request, the headers of which are shown in Packets 1 and 2, resulted in a download of the first 51,448 bytes, the byte-serving request to retrieve the remaining packets may include headers, such as shown in Packets 3 and 4:

GET/samples/Sample5.PDF HTTP/1.1\r\n
Host: www.hostname.com\r\n
Range: bytes-51448—
If-Range: "ca33-47ac67b902480"
PACKET 3
HTTP/1.1 206 Partial Content
Date: Day Month Year Hour:Minute:Second GMT
Server: ServerName
ETag: "ca33-47ac67b902480"
Accept-Range: bytes
Content-Length: 315
Content-Range: bytes 51448-51762/51763
Content-Type: application/pdf
PACKET 4

In the byte-serving request, the Range defines the beginning byte number of the remaining packets to be downloaded, as shown in Packet 4. The If-Range field is filled with the ETag value received from the server 108 for the same resource in the previous connection. On receipt of this request, the server 108 checks if the resource has changed from the previous one sent to the client by comparing the value of "If-Range" with the current ETag computed for the resource. If the value is same, the server 108 enables byte-serving features to send the remainder of the content of the resource to the client. The Content-Length indicates how many bytes are remaining to be downloaded. Additionally, the Content-Range specifies the range of bytes to be downloaded, along with the byte number of the end of file for the resource.

At block 214, the UTM 112 detects the byte-serving request. The UTM 112 may detect the byte-serving request using deep packet inspection (DPI). The presence of the Range field, shown in Packet 4, indicates this is a byte-serving request intended for handling partial content.

At block 216, the UTM 112 determines whether the resource has been previously determined to contain malware. Once the connection is detected as handling partial content, the firewall device 104 intercepts the HTTP GET requests. Using DPI, the HOST and URL fields are extracted and an absolute URL is generated. Then, the UTM 112 computes a hash value for the absolute URL. A lookup is thus performed on the detected malware hash lookup table using the computed hash value. If the lookup is not successful, i.e., there is no entry in the detected malware hash lookup table for the absolute URL, then the resource has not been previously determined to contain malware. Accordingly, the method flows to block 220, where the request is sent to the server 108. If the lookup is successful, the resource has previously been determined to contain malware. In such a scenario, passing the byte-serving request to the server 108 results in the malware being downloaded to the client. Accordingly, control flows to block 218.

At block 218, the byte-serving request is modified. As stated previously, if the If-Range value is the same as the current Etag for the resource, the server 108 enables byte-serving features to send the remainder of the content of the resource to the client. However, in implementations of the claimed subject matter, the UTM 112 modifies the HTTP GET request by changing the value of the If-Range field. On receipt of this new value in the HTTP GET, the server 108 detects a mismatch between the current ETag and the value received in the If-Range field. This results in the server 108 disabling the byte serving functionality, thereby sending the complete resource again. Once the UTM 112 processes the complete file again, the UTM 112 detects the malware again, thus preventing infection of the client 102.

This process flow diagram is not intended to indicate that the blocks of the example method 200 are to be executed in any particular order, or that all of the blocks are to be included in every case. Further, any number of additional blocks not shown may be included within the example method 200, depending on the details of the specific implementation.

Figure 3:
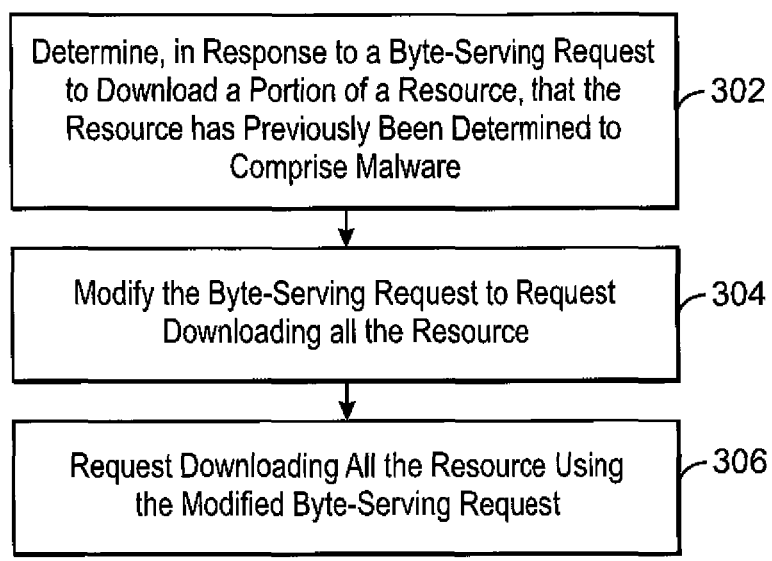
FIG. 3 is a process flow diagram showing an example method of preventing malware downloads.

FIG. 3 is a process flow diagram showing an example method 300 of preventing malware downloads. The example method is generally referred to by the reference number 300 and can be implemented using the processor 408 of the example system 400 of FIG. 4 below. The method 300 is performed by the UTM 112, and begins at block 302, where the UTM 112 determines, in response to a byte-serving request to download a portion of a resource, that the resource has previously been determined to comprise malware. As stated previously, the UTM 112 determines the resource has previously been determined to comprise malware by performing a successful hash lookup using the absolute URL of the resource.

At block 304, the UTM 112 modifies the byte-serving request to request downloading all the resource. As stated previously, the If-range field of the byte-serving request may be modified so that it does not match the current Etag of the resource.

At block 306, the UTM 112 requests downloading all the resource using the modified byte-serving request.

Figure 4:
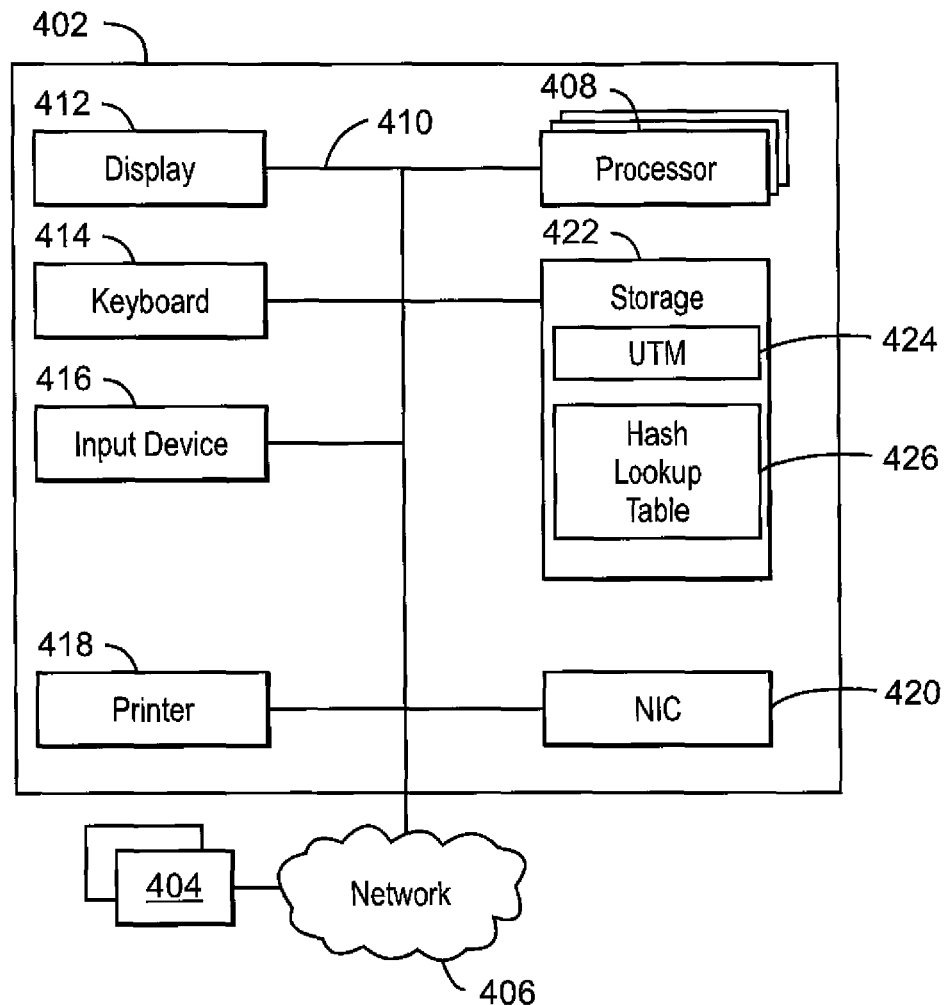
FIG. 4 is a block diagram of an example system for preventing malware downloads.

FIG. 4 is a block diagram of an example system 400 for preventing malware downloads. The system is generally referred to by the reference number 400.

The system 400 may include a firewall device 402, and one or more client computers 404, in communication over a network 406. As used herein, the firewall device 402 may include a server, a personal computer, a tablet computer, and the like. As illustrated in FIG. 4, the firewall device 402 may include one or more processors 408, which may be connected through a bus 410 to a display 412, a keyboard 414, one or more input devices 416, and an output device, such as a printer 418. The input devices 416 may include devices such as a mouse or touch screen. The processors 408 may include a single core, multiples cores, or a cluster of cores in a cloud computing architecture. The computing device 402 may also be connected through the bus 410 to a network interface card (NIC) 420. The NIC 420 may connect the firewall device 402 to the network 406.

The network 406 may be a local area network (LAN), a wide area network (WAN), or another network configuration. The network 406 may include routers, switches, modems, or any other kind of interface device used for interconnection. The network 406 may connect to several client computers 404. Through the network 406, several client computers 404 may connect to the firewall device 402. Further, the firewall device 402 may prevent malware from entering the network 406. The client computers 404 may be similarly structured as the firewall device 402.

The firewall device 402 may have other units operatively coupled to the processor 408 through the bus 410. These units may include non-transitory, tangible, machine-readable storage media, such as storage 422. The storage 422 may include any combinations of hard drives, read-only memory (ROM), random access memory (RAM), RAM drives, flash drives, optical drives, cache memory, and the like. The storage 422 may include a unified threat manager (UTM) 424, which performs the techniques described herein.

The storage 422 may also include a hash lookup table 426. The hash lookup table 426 includes an entry for each resource determined to contain malware. The UTM 424 uses the hash lookup table 426 to determine if resources requested by the clients 404 have been previously determined to contain malware. Further, the UTM 424 may add entries to the hash lookup table 426 whenever a requested resource is determined to contain malware.

Figure 5:
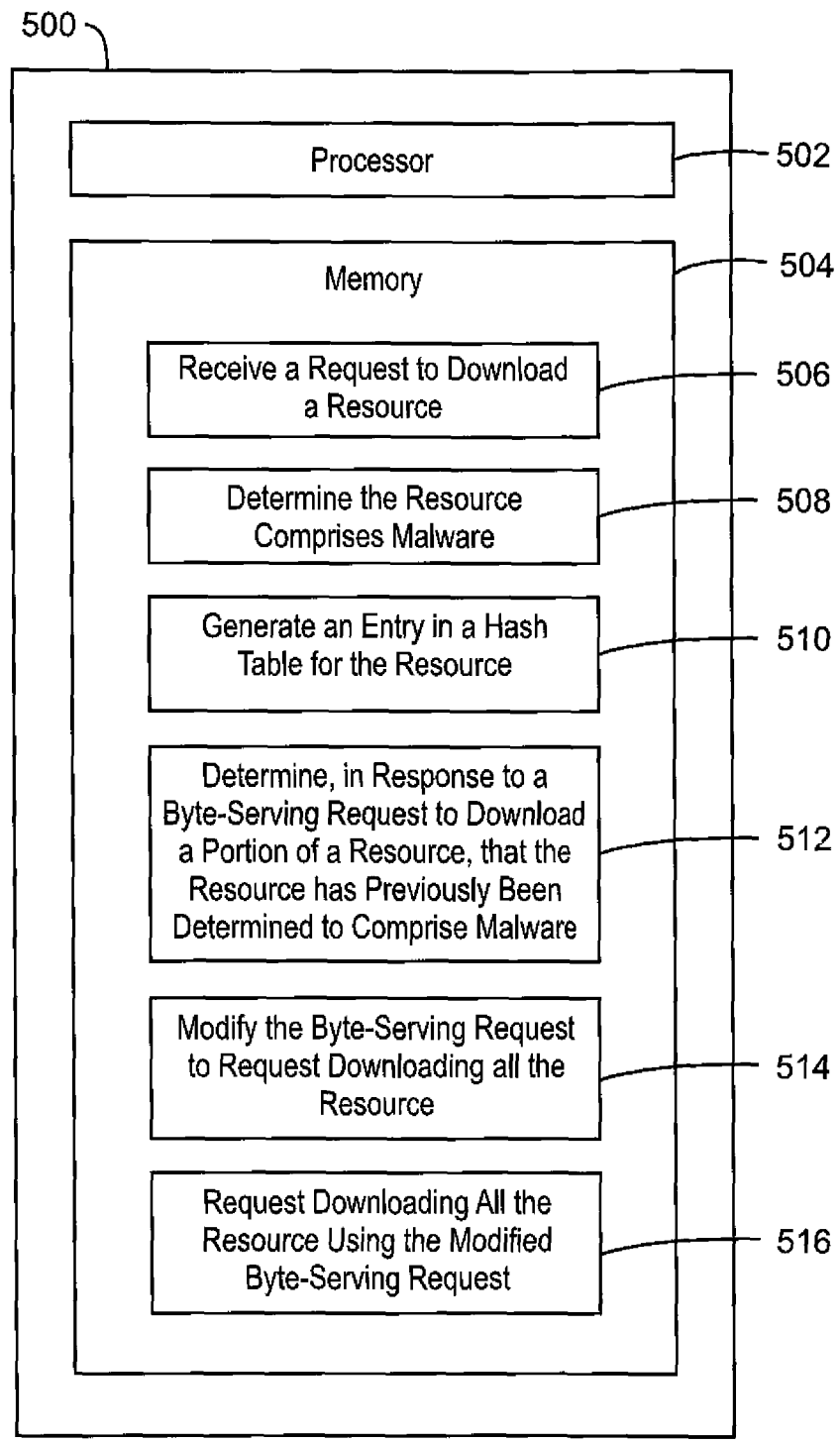
FIG. 5 is a block diagram of an example system for preventing malware downloads.

FIG. 5 is a block diagram of an example system 500 for preventing malware downloads. The system is generally referred to by the reference number 500. The system 500 is a computing device that includes a processor 502 and a memory 504. The memory 504 includes code 506 to receive a request to download a resource. The memory 504 also includes code 508 to determine the resource comprises malware. Additionally, the memory 504 includes code 510 to generate an entry in a hash table for the resource. Further, the memory 504 includes code 512 to determine, in response to a byte-serving request to download a portion of a resource, that the resource has previously been determined to comprise malware. Also, the memory 504 includes code 514 to modify the byte-serving request to request downloading all the resource. The memory 504 further includes code 516 to request downloading all the resource using the modified byte-serving request.

Figure 6:
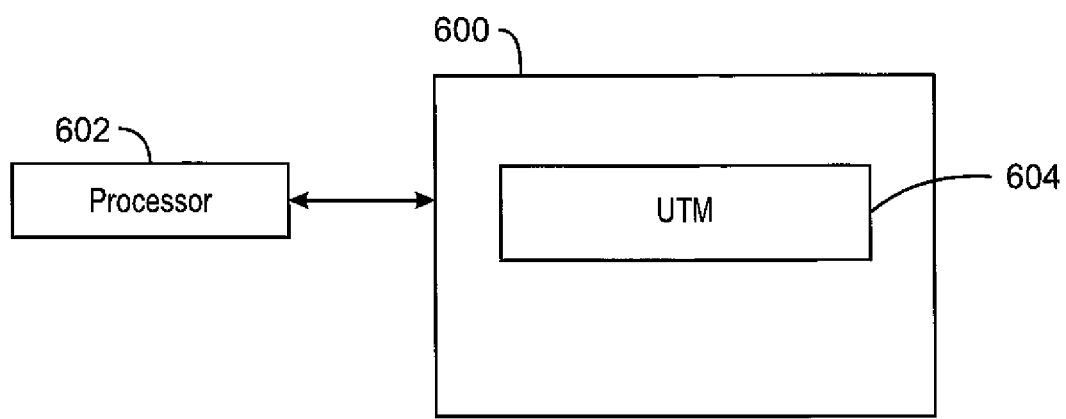
FIG. 6 is a block diagram showing an example non-transitory, tangible computer-readable medium that stores code for preventing malware downloads.

FIG. 6 is a block diagram showing an example non-transitory, tangible computer-readable medium 600 that stores code for preventing malware downloads. The non-transitory, tangible computer-readable medium is generally referred to by the reference number 600.

The non-transitory, tangible computer-readable medium 600 may correspond to any typical storage device that stores computer-implemented instructions, such as programming code or the like. For example, the non-transitory, tangible computer-readable medium 600 may include one or more of a non-volatile memory, a volatile memory, and/or one or more storage devices.

Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disks, compact disc drives, digital versatile disc drives, and flash memory devices.

A processor 602 generally retrieves and executes the computer-implemented instructions stored in the non-transitory, tangible computer-readable medium 600 for preventing malware downloads. A unified threat manager 604 may prevent malware downloads on byte serving requests for resources previously requested. In examples of the claimed subject matter. The unified threat manager 604 maintains a hash lookup table that contains an entry for all requested resources found to contain malware. Subsequently, whenever a byte serving request is submitted for a resource, the UTM 604 checks the hash lookup table to determine if the resource was previously determined to contain malware. If so, the byte-serving request is modified such that the request downloads the entire resource.

Although shown as contiguous blocks, the software components can be stored in any order or configuration. For example, if the computer-readable medium 600 is a hard drive, the software components can be stored in non-contiguous, or even overlapping, sectors.

Figure 7:
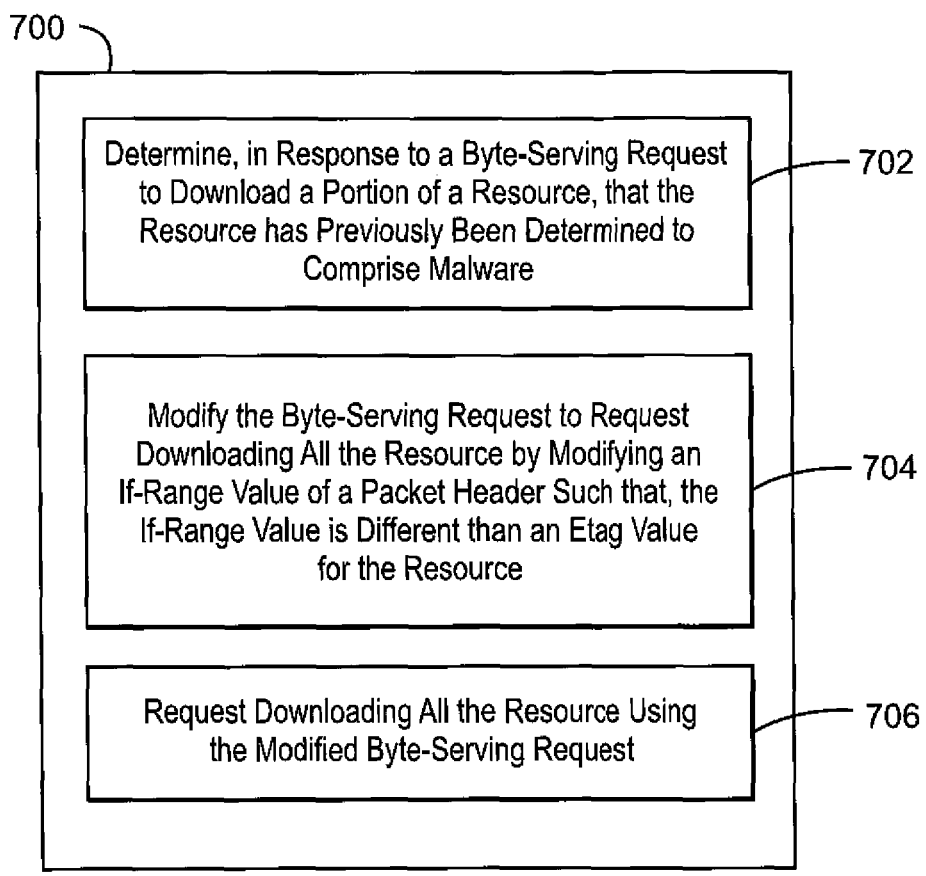
FIG. 7 is a block diagram showing an example non-transitory, tangible computer-readable medium that stores code for preventing malware downloads.

FIG. 7 is a block diagram showing an example non-transitory, tangible computer-readable medium 700 that stores code for preventing malware downloads. The non-transitory, tangible computer-readable medium is generally referred to by the reference number 700. The medium 700 includes code 702 to determine, in response to a byte-serving request to download a portion of a resource, that the resource has previously been determined to comprise malware. The medium 700 also includes code 704 to modify the byte-serving request to request downloading all the resource by modifying an If-Range value of a packet header such that, the If-Range value is different than an Etag value for the resource. The medium 700 additionally includes code 706 to request downloading all the resource using the modified byte-serving request.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for preventing malware downloads, comprising:
   receiving, by a system comprising a hardware processor, a byte-serving request to download a portion of a resource;
   determining, by the system, that the resource requested by the byte-serving request has previously been determined to comprise malware;
   based on determining that the resource has previously been determined to comprise malware, modifying, by the system, the byte-serving request to request downloading all the resource; and
   requesting, by the system, downloading all the resource using the modified byte-serving request.

2. The method of claim 1, comprising:
   receiving a request to download a first resource;
   determining, by the system, the first resource comprises malware; and
   generating, by the system, an entry in a hash table for the first resource.

3. The method of claim 2, wherein the generating of the entry in the hash table comprises:
   determining an absolute uniform resource locator (URL) for the first resource; and
   determining a hash value for the absolute URL, wherein the entry comprises the hash value for the absolute URL.

4. The method of claim 3, wherein the determining that the resource requested by the byte-serving request has previously been determined to comprise malware comprises determining that a hash value for the resource matches an entry in the hash table.

5. The method of claim 3, wherein the determining that the resource requested by the byte-serving request has previously been determined to comprise malware comprises:
   determining an associated absolute URL associated with the byte-serving request;
   computing a hash value for the associated absolute URL determined for the byte-serving request; and
   performing a successful lookup in the hash table based on the computed hash value for the associated absolute URL.

6. The method of claim 1, wherein the modifying of the byte-serving request to request downloading all the resource comprises modifying an If-Range value of a packet header that produces a modified If-Range value different than an Etag value for the resource.

7. The method of claim 6, wherein the modified If-Range value being different from the Etag value for the resource disables a byte serving functionality associated with downloading the resource.

8. The method of claim 1, wherein the requesting the downloading of all the resource using the modified byte-serving request comprises sending the modified byte-serving request to a server hosting the resource.

9. The method of claim 1, wherein the byte-serving request comprises a Range field defining a beginning byte number of remaining packets of the resource to be downloaded, the remaining packets being in addition to previously downloaded packets of the resource.

10. The method of claim 1, wherein the receiving of the byte-serving request, the determining that the resource requested by the byte-serving request has previously been determined to comprise malware, the modifying of the byte-serving request, and the requesting of the downloading of all the resource are performed by a firewall device in the system.

11. A system comprising:
a processor; and
a memory comprising code that causes the processor to:
  receive a request to download a resource;
  determine the resource comprises malware;
  generate an entry in a hash table for the resource;
  receive a byte-serving request to download a portion of the resource;
  determine that the resource requested by the byte-serving request has previously been determined to comprise malware;
  based on determining that the resource has previously been determined to comprise malware, modify the byte-serving request to request downloading all the resource; and
  request downloading all the resource using the modified byte-serving request.

12. The system of claim 11, wherein the generating of the entry in the hash table comprises:
determining an absolute uniform resource locator (URL) for the resource; and
determining a hash value based on the absolute URL, wherein the entry comprises the hash value based on the absolute URL.

13. The system of claim 12, wherein the determining that the resource requested by the byte-serving request has previously been determined to comprise malware comprises:
determining an associated absolute URL based on fields in the byte-serving request;
computing a hash value based on the associated absolute URL determined based on the fields in the byte-serving request; and
performing a successful lookup in the hash table based on the computed hash value.

14. The system of claim 11, wherein the modifying of the byte-serving request to request downloading all the resource comprises modifying an If-Range value of a packet header that produces a modified If-Range value different than an Etag value for the resource.

15. The system of claim 14, wherein the modified If-Range value being different from the Etag value for the resource disables a byte serving functionality associated with downloading the resource.

16. The system of claim 11, wherein the requesting the downloading of all the resource using the modified byte-serving request comprises sending the modified byte-serving request to a server hosting the resource.

17. A non-transitory, tangible computer-readable medium, comprising code to direct a processor to:
determine, in response to a byte-serving request to download a portion of a resource, that the resource has previously been determined to comprise malware;
in response to determining that the resource has previously been determined to comprise malware, modify the byte-serving request to request downloading all the resource by modifying an If-Range value of a packet header such that the If-Range value is different than an Etag value for the resource; and
request downloading all the resource using the modified byte-serving request.

18. The non-transitory, tangible computer-readable medium of claim 17, comprising code to direct the processor to:
receive a request to download a first resource;
determine the first resource comprises malware; and
generate an entry in a hash table for the first resource.

19. The non-transitory, tangible computer-readable medium of claim 18, wherein the generating of the entry of the hash table comprises:
determining an absolute uniform resource locator (URL) for the resource; and
determining a hash value based on the absolute URL, wherein the entry comprises the hash value based on the absolute URL.

20. The non-transitory, tangible computer-readable medium of claim 19, wherein the determining that the resource has previously been determined to comprise malware comprises:
determining an associated absolute URL based on fields in the byte-serving request;
computing a hash value based on the associated absolute URL determined based on the fields in the byte-serving request; and
performing a successful lookup in the hash table based on the computed hash value.

* * * * *